April 22, 1930.  F. A. MILLER  1,755,511

POWER SHEARS

Filed May 28, 1928

Inventor:
Frank A. Miller
By Kent W. Worrell
Atty.

Patented Apr. 22, 1930

1,755,511

UNITED STATES PATENT OFFICE

FRANK A. MILLER, OF AURORA, ILLINOIS

POWER SHEARS

Application filed May 28, 1928. Serial No. 281,166.

This invention relates to power shears and is more particularly described as an electric shears for cutting cloth, fabric, and the like.

A principal object of the invention is in the provision of a shears of this kind which is easily controlled both in its speed of operation and its movement over a surface upon which the material to be cut is supported.

Other objects will appear hereinafter.

Figure 1:
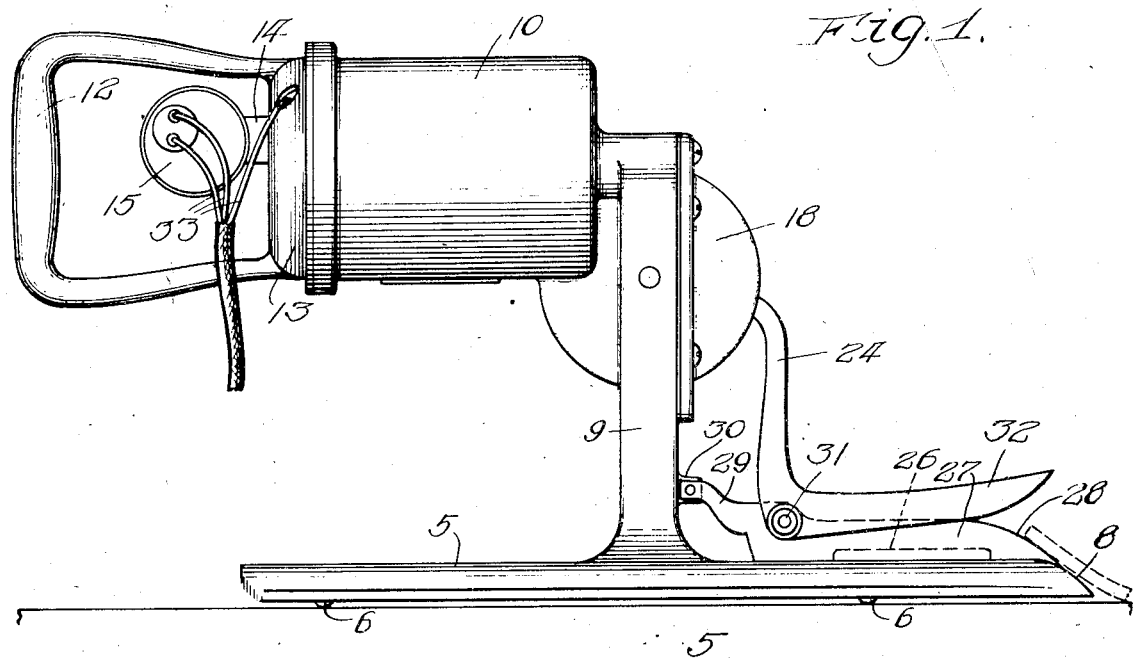
Figure 2:
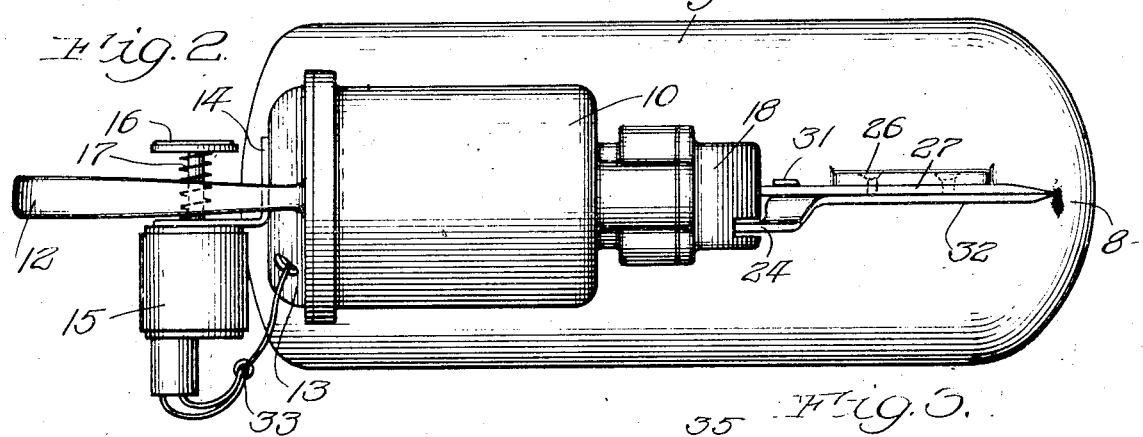
Figure 4:
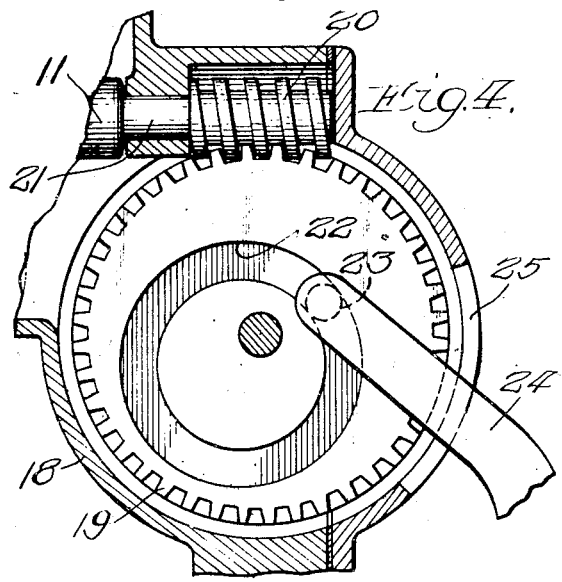
Figure 3:
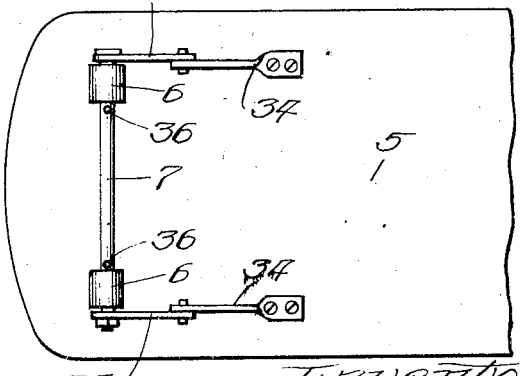

In the accompanying drawing, Figure 1 is a side elevation and Figure 2 is a top view of a power shears constructed in accordance with the principles of this invention; Figure 3 is a bottom view showing the supporting roller; and Figure 4 is a sectional detail showing the driving connection.

In cutting various kinds of cloth, fabric and the like, it is customary to cut several thicknesses of the material at the same time to expedite the work and save the time of the operator. When a number of thicknesses of material are cut at the same time it becomes difficult to do this entirely with a hand shears, and the present invention provides an easily operable power driven shears mounted upon a movable base with the cutting element at one end and the steering and controlling handle at the other end so that the machine may be easily directed and controlled for cutting rapidly and slowly and may be guided with the greatest ease to cut rapidly and accurately.

Referring more particularly to the drawings, a base 5 of somewhat oblong form, rounded at the ends, is recessed on the under side to receive rollers 6 mounted on shafts 7 for supporting it close to the surface of a support upon which it is to be moved. The front extremity 8 is rather sharply inclined from the lower edge upwardly so that the material to be cut is directed thereby to the top of the base.

Centrally located upon the base is a support 9 for a motor casing 10 in which an electric motor 11 is mounted. At the end of the casing remote from the support is a handle 12 forming an extension of a motor end casing 13. Located within the opening of the handle 12 and mounted upon a bracket 14, projecting from the end casing 13, is a motor control rheostat 15 having a member 16 pressed outwardly from the rheostat by a spring 17 for controlling the speed of the motor. The controlling member 16 is conveniently located within the handle 12 where it may easily be engaged and operated by the thumb or finger of an operator without removing his hand from the handle 12.

At the other end of the motor and enclosed in a suitable casing 18 is a gear 19 which is rotated by a worm 20 secured to a shaft 21 of the motor. One side of the gear 19 is formed with an eccentric groove or box cam 22 adapted to engage a projection 23 at one end of a lever 24 which projects through a slot 25 in the gear casing 18 for operating the shears.

Seated in a recess in the base 5 and secured to an upstanding ledge 26 at one side of the recess is a fixed shears blade 27 having its outer end 28 rounded downwardly to form a smooth surface for material to be cut to ride upwardly thereon and substantially in continuation of the curved end 8 of the base. The rear end of the blade 27 is additionally supported by an extension 29 which is secured to a projection 30 from the support 9. The lever 24 is mounted upon a pivot 31 which passes through it and the fixed blade 27 adjacent the rear end thereof and the free end of this lever is in the form of a shear blade 32 which cooperates with the fixed blade 27.

Current is led to the motor and to the rheostat by conductors 33 which receive current from any suitable source of supply, the conductors being included in a flexible cord which permits a free movement of the power shears in any direction.

Any suitable mounting may be provided for the supporting rollers 7 and the shaft 6, such for example as illustrated in Figure 3, comprising a pair of brackets 34 fixed to the under side of the base 5 and twisted at their outer ends to support pivoted arms 35. The shaft 7 is fixed in the arms 35 and the rollers 6 rotated freely thereon, the shaft being provided with one or more bearing pins 36 extending through the shaft and contacting with the under side of the base to prevent engagement of the rollers 6 with the under side of the base and to permit a free rotation thereof.

With this construction it is obvious that the power shears is placed upon the same surface which supports the material to be cut, the forward edge 8 of the base is inserted under the edge of the material and the base of the power shears is advanced by means of the handle 12 until the material to be cut is engaged by shears 27, 32. The speed of the shears is controlled by the rheostat 14 and is varied as desired, depending upon the nature of goods to be cut and the direction of movement of the shears, it being obvious that the shears will be operated at slower speed for cutting an irregular line than for cutting a straight line in the same material. As the cutting blades are at one end of the base and the guiding handle 12 is at the other end, it is obvious that the directing movement of the base is varied and controlled with the greatest facility. The rotation of the motor and the gear 19 causes a positive movement of the upper plate 32 in both directions and a full stroke of the blade for each rotation of the gear. This enables the shears to be used for any material for which it is adapted, either in a single thickness or in many thicknesses, so that many pieces of the same pattern may be cut at the same time.

The support 9 is centrally located on the base 5, is secured to or formed integrally therewith, and is of limited width so that the material cut by the shears will pass readily at both sides thereof. Being located centrally of the base and close to the pivot point of the shears with the motor spaced above the base the entire device may be moved more readily into the material to be cut and may be easily turned for following the pattern. The material of the base and casings is light and strong so that the device may be easily moved and lifted.

I claim:

1. In a power shears, a movable base, shears opening at the front end of the base, a central support extending upwardly from the base, a motor casing and a motor mounted at the upper end of the support, means forming an operating connection between one end of the motor and the shears, a handle extending rearwardly from the free end of the motor casing having a central opening therein, and a motor rheostat mounted on the casing and having an operable spring pressed member located within the opening of the handle for manual engagement by the hand of an operator without disengaging the hand from the handle.

2. In a power shears, a movable base, a shears comprising fixed and movable blades at one end of the base, a support extending upwardly from the base, means forming gear and motor casings at the upper end of the support, a motor mounted in one of the casings, a driving gear mounted in another casing having a direct driving connection with the motor, the movable shear blade having an extending arm with a projection thereon, the gear casing having a slot therein for receiving the arm, and the gear having means engaging the projection for positively moving the shear blade when the motor is operated.

3. In a power shears, a base having a recessed under surface, rollers in the recess for supporting the base with its lower edge close to the surface upon which lies the material to be cut, an upwardly projecting central support, a pair of shears in front of the support having their pivot point located adjacent to the support, one of the shear blades having an upwardly extending operating arm, motor driven means at the top of the support for engaging the arm, a casing member with a rearwardly extending open handle mounted at the upper end of the support, said handle being located above the rear end of the base so that the movement of the shears at the forward end of the base is easily controlled thereby.

4. In a power shears, a supporting base beveled at its front edge and having a recessed under surface, means in the recessed under surface for supporting the base with the lower edge close to the surface upon which a material to be cut is supported, a shears comprising a blade fixed to the base having an inclined outer end forming substantially a continuation of the beveled front end of the base, and a movable blade pivoted to the fixed blade at the rear end thereof adjacent to the center of the base, power means supported centrally of the base for operating the movable blade, and a handle comprising an extension of the central supported means located at the rear and above the base for moving and guiding the opposite end of the base into a material to be cut.

5. In a power operated shears, a supporting base with a central upright support and a beveled front edge, a blade fixed in the base having an inclined front end substantially conforming to the beveled front edge and having the rear extension attached to the support above the base, a movable blade pivoted to the fixed blade adjacent the rear end thereof below the attachment of the fixed blade to the support and having an operating arm extending upwardly in front of the support, means forming a motor casing extending rearwardly from the upper end of the support, a motor mounted in said casing, a rear motor casing having an open handle forming an extension thereof and located above and at the rear of the base, a rheostat supported by the motor casing within the opening of the handle having a spring pressed operating member projecting at one side of the handle for manual engagement, means forming a gear casing at the upper end of the support, a gear mounted in the casing, a worm on the motor shaft engaging the gear, and an eccentric driving connection between the gear and the arm of the movable shear blade, the arm extending through a slot in the gear casing, and the movable blade being positively reciprocated as the gear is rotated.

FRANK A. MILLER.